US012223868B1

(12) United States Patent
Namadar et al.

(10) Patent No.: US 12,223,868 B1
(45) Date of Patent: Feb. 11, 2025

(54) DISPLAY SCREEN ANOMALY DETECTION SYSTEM

(71) Applicant: Microsoft Technology Licensing, LLC, Redmond, WA (US)

(72) Inventors: Utsav Babasaheb Namadar, Redmond, WA (US); Jason Williams, Kenmore, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/402,401

(22) Filed: Jan. 2, 2024

(51) Int. Cl.
*G09G 3/00* (2006.01)
*G09G 5/10* (2006.01)

(52) U.S. Cl.
CPC ............... *G09G 3/006* (2013.01); *G09G 5/10* (2013.01); *G09G 2320/0247* (2013.01); *G09G 2320/0626* (2013.01)

(58) Field of Classification Search
CPC ........... G09G 3/006; G09G 2320/0247; G09G 2320/0626; G09G 5/10
See application file for complete search history.

(56) References Cited

U.S. PATENT DOCUMENTS

| 8,188,952 | B1* | 5/2012 | Orlando | G09G 3/3648 345/87 |
| 2010/0191492 | A1* | 7/2010 | Kawashima | G09G 3/3208 702/66 |
| 2011/0187754 | A1* | 8/2011 | Yoo | G09G 3/30 345/76 |
| 2013/0265345 | A1* | 10/2013 | Krig | G09G 3/36 345/87 |
| 2014/0176518 | A1* | 6/2014 | Min | G09G 3/20 345/207 |
| 2015/0206494 | A1* | 7/2015 | Syu | G09G 3/3696 345/207 |
| 2016/0140890 | A1* | 5/2016 | Kim | G09G 3/3614 345/89 |
| 2017/0352308 | A1* | 12/2017 | Park | H01L 33/0008 |
| 2024/0129637 | A1* | 4/2024 | Rodriguez | G06F 3/1438 |

* cited by examiner

*Primary Examiner* — Ryan A Lubit

(57) ABSTRACT

Techniques and systems for enhanced detection and correlation of transient anomalies in frames or graphics displayed on a display screen, such as flicker events. In one example, a method includes obtaining luminosity measurements of a display acquired over a series of frames depicted on the display, processing the luminosity measurements to form a luminosity signature for the series of frames, and detecting transient anomalies for the display based at least on the luminosity signature.

20 Claims, 8 Drawing Sheets

DISPLAY SCREEN ANOMALY DETECTION SYSTEM

BACKGROUND

Display screens are employed in many computing systems for providing visual user interfaces to operators as well as for display of various media or content. The display screens contain various hardware elements, such as display panels, backlights, panel driver circuitry, and display communication links which couple to a computing system having software elements providing graphics that are displayed. However, various updates or changes to software or hardware elements of a computing system having a display can produce unwanted behavior in the display of graphics due to bugs, interoperability issues, unforeseen impacts, and other problems.

Thus, fault detection testing or other verification/validation testing is often performed for various components of a computing system. However, issues exhibited by display of graphics or media content over time can be difficult or cumbersome to detect. This can be especially difficult during playback monitoring of large media files comprising very dense data sets as displays comprise ever-increasing screen resolutions and pixel densities. Transient events can include flicker events, which are visual anomalies that produce rapid unwanted visual changes to a display, such as screen blanking events or screen color saturation events.

SUMMARY

Presented herein are techniques and systems for enhanced detection and correlation of transient anomalies in frames of graphics displayed on a display screen, such as flicker events. These transient anomalies can be detected in computing systems having graphical displays which depict user interface features to users, as well as provide various media/content playback. While the examples herein discuss visual anomaly detection, such as flicker event detection, similar techniques can be applied to other sensory anomaly detection, such as audio, when corresponding hardware interfaces and monitoring elements are employed.

In one example implementation, a method includes obtaining luminosity measurements of a display acquired over a series of frames depicted on the display, processing the luminosity measurements to form a luminosity signature for the series of frames, and detecting transient anomalies for the display based at least on the luminosity signature.

Another example implementation includes a processing system operatively coupled with one or more computer readable storage media, and program instructions stored on the one or more computer readable storage media. Based at least on being read and executed by the processing system, the program instructions direct the processing system to at least obtain luminosity measurements of a display acquired over a series of frames depicted on the display, process the luminosity measurements to form a luminosity signature for the series of frames, and detect transient anomalies for the display based at least on the luminosity signature.

In yet another example implementation, a system comprises a luminosity assembly including luminosity sensors configured to acquire luminosity measurements of a display over a series of frames depicted on the display. The system also comprises a luminosity processor configured to receive the luminosity measurements and process the luminosity measurements to form a luminosity signature for the series of frames, and correlate in time the luminosity signature to a reference signature to determine differences between the luminosity signature and the reference signature. The luminosity processor also can process the luminosity signature in a frequency domain at timeframes corresponding to the differences to determine frequency components above a threshold frequency selected to signify screen flicker anomalies.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Fault or anomaly detection during testing of computing systems can be employed to verify operation of display screens and the various elements forming a computing device coupled to the display screen, which include software elements that generate the graphics, user interface elements, or other visual data ultimately displayed on the display screen. One of the challenges in developing and testing software for computing devices is to detect and report any visual or audible problems introduced from software (or changes thereto) which may affect the customer experience. Moreover, individual devices might exhibit failures from unwanted transient behavior exhibited by a display screen during fault detection, manufacturing testing, or other processes.

However, issues exhibited by display of graphics or media content over long periods of time can be difficult or cumbersome to detect, often requiring large sets of test data that are post-processed to determine faults. This can be especially pronounced when performing testing related to software updates which might apply over many systems or devices. Software updates can also affect many components of a computing system which may be difficult to isolate from among operating systems, graphics drivers, graphics rendering engines, applications, and other various software. The examples herein can automate testing, deployment, and fault detection of computing systems, which can accelerate the development cycle for such computing systems and improve customer satisfaction by delivering higher quality software or hardware.

The example implementations discussed herein provide techniques, software, testing apparatuses, and systems for enhanced detection and correlation of transient anomalies in frames of graphics displayed on a display screen, such as flicker events. As discussed herein, transient events or transient anomalies can include flicker events on a display, which are visual anomalies that produce rapid unwanted visual changes to a display, such as screen blanking events or screen color saturation events. These transient anomalies can be detected in computing systems having graphical displays which depict user interface features to users, as well as provide various media/content playback. Humans can perceive flicker that is greater than approximately 33 milliseconds (ms) in duration. However, as display/graphics technology has increased to have refresh rates exceeding 120 Hz (i.e., 120 frames per second), some single-frame flicker events occur too quickly for the human eye to detect. For instance, one frame of flicker in 120 Hz video is approximately 8.3 ms in duration. Advantageously, the examples herein discuss various technical benefits and technical effects for automated anomaly detection in computing systems, such as flicker event detection. Similar techniques can be applied to other sensory anomaly detection, such as audio, when corresponding hardware interfaces and monitoring elements are employed.

Figure 1:
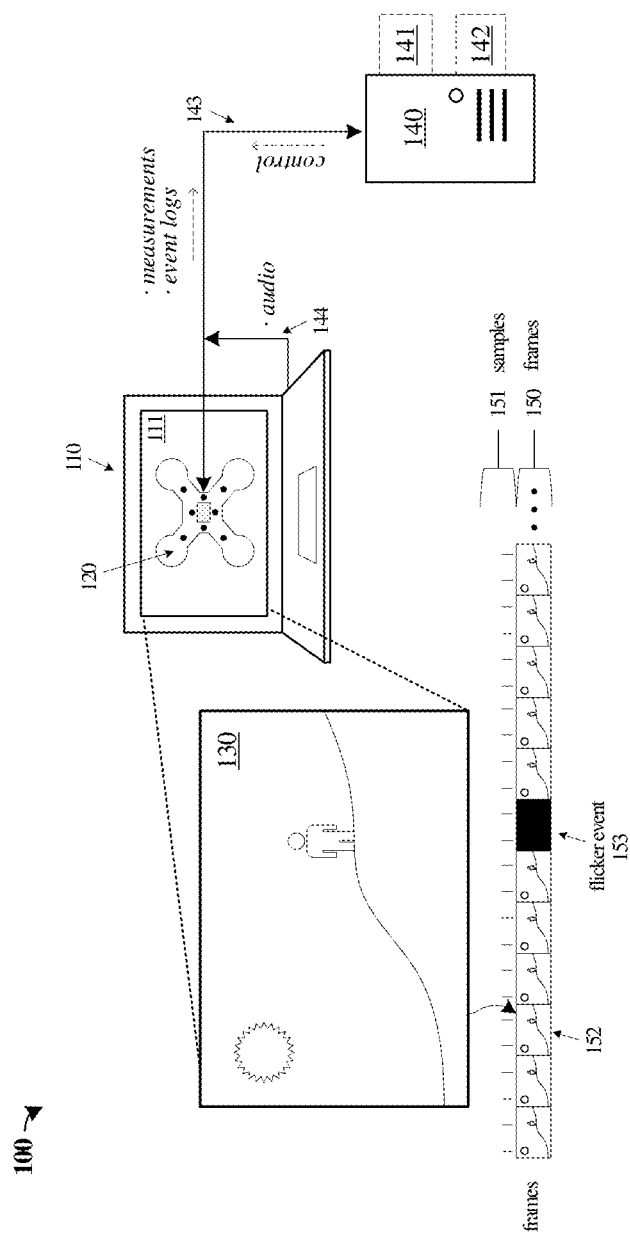
FIG. 1 illustrates a testing environment in an implementation.

Turning now to a first example implementation, FIG. 1 is presented. FIG. 1 includes testing environment 100 which includes various elements employed for computing systems and testing for anomalies during operation. Environment 100 includes test device 110, test fixture 120, and anomaly detection device 140. Test fixture 120 is mounted to display screen 111 of test device 110, and provides various measurement data to anomaly detection device 140 over link 143.

Text fixture 120 can be applied to display screen 111 during a testing operation to perform measurements of display screen 111. Measurements made by text fixture 120 can be provided over link 143 to anomaly detection device 140. These measurements can include luminosity measurements made of display screen 111, as well as audio measurements made for test device 110. Test fixture 120 comprises a plurality of luminosity sensors which measure luminosity of display screen 111 at various locations. Test fixture 120 can optionally accumulate luminosity measurements over various sensors and over time, as well as audio measurements, and provide data comprising accumulated measurements over audio link 144, and provide over link 143.

During testing operations, a series of frames are depicted on display screen 111, such as shown for frames 150 for test graphics 130. Test graphics 130 can comprise playback of media content, sequences of user interface graphics, or other sequences of changing displayed graphics. While a static image might be displayed on display screen 111, multi-point luminosity measurements can be obtained by test fixture 120 typically are made over time using changing graphics or images, such as encountered during movie playback, on-screen animations, user interface interactions, computer startup/boot processes, automated scripting of dynamic user interface activities, and the like. Display of graphics or other images on display screen 111 has a granularity of individual frames which are refreshed periodically according to a display refresh rate, which can be separate from any media frame rate. The measurements of multiple points of luminosity as well as multiple frames of images or graphics provides several technical benefits and technical effects. These technical benefits and technical effects include the ability to establish luminosity signatures or fingerprints which use less storage space and processing power in determination of transient anomalies than storing screen-captured recordings of a display screen during testing or other techniques. Moreover, technical benefits and technical effects provide for near-real time determination of anomalies, such as screen flicker, which do not employ extensive video post-processing operations.

A display refresh rate is often listed in terms of frames-per-second (FPS) or cycles-per-second (Hertz, or Hz), and is the rate at which display screen 111 updates corresponding graphics which are provided over a display link after being rendered by a graphics unit of test device 110. A sample rate (shown for luminosity samples 151) of the luminosity measurements made by test fixture 120 can comply with a Nyquist rate for the frame/refresh rate, such as two or more measurements/samples per frame. The sample rate might include 320 samples/second in some examples. Thus, the quantity of luminosity samples 151 can correspond to a sample rate multiplied by the quantity of sensors employed, such as eight (8) in this example. Other test setup parameters can include target brightness levels, such as over 75% of a maximum brightness, and when audio is employed, a target audio volume (e.g., over 75% of a maximum volume). Other test setup parameters can be employed.

Anomaly detection device 140 can comprise control interface 141 which can receive or otherwise obtain the luminosity measurements, such as samples 151 for each luminosity sensor, over link 143. Additionally, audio data, which may comprise recorded audio, filtered audio, sampled audio, or other audio representations, can accompany the luminosity measurements over link 143, or may be provided separately (e.g., over link 144). Control interface 141 can provide control instructions or commands to test fixture 120 over link 143, or other links, which can include indications on when to commence luminosity or audio measurements, boot up/start up instructions for processor elements of test fixture 120. Operating power might be provided to test fixture 120 over link 143 from device 140, such as when link 143 comprises a universal serial bus (USB) type-C compliant link, among others. Operating power might instead be provided to test fixture 120 from other sources, such as from test device 110 or from independent power sources.

Anomaly detection device 140 can include luminosity processor 142, which in some examples, obtains luminosity measurements or audio measurements as samples made over time. In some examples, luminosity processor 142 can process the luminosity measurements to form a luminosity signature for the series of frames that correspond to the luminosity measurements, and then detect transient anomalies shown on display screen 111 based at least on the luminosity signature. The luminosity measurements comprise samples over the series of frames of intensities, magnitudes, or amplitudes corresponding to luminosity measured at multiple selected locations on display screen 111. The luminosity signature can comprise an accumulated set of luminosity samples for the multiple luminosity sensors over a timeframe employed for the testing operations, and these luminosity samples can be correlated in time to each other such that each measurement location can have a corresponding timestamp or frame identifier among the series of frames. For example, if a testing operation proceeds for 10 minutes, then luminosity measurements for each luminosity sensor at the sample rate are combined into a composite set of luminosity samples correlated in time or to particular frames.

Luminosity processor 142 can process the luminosity signature in a time domain or a frequency domain to determine transient (visual or audio) anomalies. In one example, luminosity processor 142 processes the luminosity signature to identify a reference luminosity signature that corresponds to the series of frames depicted on the display. A reference luminosity signature can be formed as a "known-good" signature for a similar or overlapping set of frames comprising a same or similar series of graphical content, such as the same media content or same set of user interface operations, which produces a similar luminosity signature for the frames. Typically, the reference luminosity signature can be determined prior to a present testing process that measures a present luminosity signature, and then stored for later use by luminosity processor 142. The reference luminosity signature might be determined using similar techniques as discussed herein for the present testing process. In other examples, a reference luminosity signature might not be employed, and instead luminosity processor 142 can employ a frequency domain processing can be employed to identify transient anomalies.

For time domain processing, the present luminosity signature might be shifted in time as compared to the reference luminosity processor. A time shift process can be performed to align the present luminosity signature to the reference luminosity signature, which might be keyed off of various trigger events, such as a start time of sequence of frames or a comparison over a segment of the frames to align various events among the luminosity signatures. Luminosity processor 142 can process the present luminosity signature against the reference luminosity signature to align the luminosity signature with respect to the reference luminosity signature in time according to luminosity events correlated among the luminosity signature and the reference luminosity signature. Alternatively, a pattern matching process can be performed across several of the samples in the present luminosity signature to find the reference luminosity signature from among several reference luminosity signatures formed for differing graphical content. Once the reference luminosity signature has been identified, then a sample-by-sample comparison might be made in the time domain to identify differences between the present luminosity signature and the reference luminosity signature. Luminosity processor 142 can compare at least a portion of the present luminosity signature against the reference luminosity signature to determine differences between the reference luminosity signature and the luminosity signature indicating transient anomalies. The use of reference luminosity signatures provide several technical benefits and technical effects. For example, the alignment of a present luminosity signature to a reference luminosity signature can provide for more effective searching and finding of a reference luminosity signature from among many reference luminosity signatures, as well as for a more efficient comparison among features within the present luminosity signature to features within the luminosity signature to identify anomalies.

In other examples, frequency domain processing can be employed to determine transient anomalies. Luminosity processor 142 can process frequency components of the present luminosity signature to determine frequency components above a threshold frequency selected to signify transient anomalies, such as screen flicker anomalies. Luminosity processor 142 can filter the present luminosity signature according to a bandpass filter having a frequency range that includes a frequency selected to indicate the transient anomalies. Then luminosity processor 142 can process the filtered (present) luminosity signature to determine instances of the filtered luminosity signature exceeding a threshold amplitude, magnitude, or intensity. The frequency range for filtering and selected frequency threshold that indicates transient anomalies can depend on various factors, including a frame rate, sample rate, and other properties of the luminosity signatures. In one example, for a graphics or display frame rate of 120 Hz and a luminosity measurement/sample rate of 240 Hz or greater, then a low frequency cut off frequency can be approximately 1 Hz, and a high frequency cut off frequency can be approximately 4 Hz. Then, signals which have amplitudes above a threshold amplitude after application of the filter can indicate transient anomalies, such as screen flicker. Frequency domain processing provides several technical effects and technical benefits, among which include increased processing efficiency and/or accuracy of identifying relevant flickering or other anomalies within luminosity signatures.

Regardless of if a time domain or frequency domain was employed to determine transient anomalies, indications of the transient anomalies can be provided to operators, users, log files, over a network or data interface, or other to destinations and links. These indications can include timestamps or sample identifiers among the luminosity signature, as well as what reference luminosity signature or graphical content is associated with the anomalies. Moreover, a correlation to system log events might be determined for test device 110. Typically, test device 110 will be running an operating system or other software/firmware for which system-level logging or event tracking is employed. Luminosity processor 142 can receive log files or event logs for test device 110 through control interface 141. Luminosity processor 142 can then correlate any discovered transient anomalies to operating system log events for test device 110 generating the series of frames and comprising the measured display screen 111. Luminosity processor 142 can correlate or align in time the transient anomalies to the operating system log events based at least on a trigger event in the operating system log events indicating a graphics rendering start time for the series of frames. This graphics rendering start time might correspond to a graphics video decode engine ramping activity up from an idle or steady-state level of activity to a higher level of activity, such as a quick ramp or step-change in activity levels. The activity levels might be measured by processor utilization, memory usage levels, rendering software initiation events, or other events which indicate that the graphical content is being rendered for display on displace screen 111 by test device 110. Technical benefits and technical effects for correlating anomalies or flicker events to log events or system events can include identifying performance aspects of an operating system (or other test device elements) during occurrence of anomalies or flicker events to more efficiently identify or localize faults or errors in devices under test.

In addition to the video or graphical data determined above, such as the luminosity measurements, audio data or audio measurements can also be employed to further localize transient events in graphical content or to identify audio-based transient events separate from graphical content. In such examples, luminosity processor 142 can receive audio measurements or audio data for test device 110 through control interface 141 which communicates over link 143. These audio measurements can correspond to the series of frames used for luminosity measurements. Luminosity processor 142 can then correlate the audio measurements to portions of the luminosity signature. Luminosity processor 142 can detect anomalies in the audio measurements which correspond to visual transient anomalies for the display, and provide indications of these audio anomalies along with indications of visual/graphical transient anomalies. Processing of audio measurements along with luminosity measurements provides several technical benefits and technical effects, such as identification of systemic faults which affect both audio and video, using audio content to determine flicker in video, such as when audio glitches or spikes/dips occur, and correlating audio events to video events for more efficient identification of flicker or other anomalies.

Returning to a discussion on the elements of FIG. 1, test device 110 comprises processing circuitry, communication interface circuitry, and user interface elements including display screen 111. Test device 110 can also include memory devices, storage devices, software, graphics rendering circuitry, or other computing components. Test device 110 can be a computer, laptop computing device, tablet computing device, smartphone, gaming console, customer equipment, access terminal, mobile Internet appliance, media player, or some other user computing apparatus, including combinations thereof. Test device 110 executes software, such as operating systems, display drivers, and applications to display graphical content on display screen 111. This graphical content can comprise any suitable dynamic or changing content, with a frame-level granularity, such as media content, movies, animations, screen savers, operating system activities in a graphical user interface, terminal displays, test sequences, scripted graphical frames, image sequences, device boot or startup graphical sequences, or other content.

Display screen 111 comprises any suitable display, such as a liquid crystal display (LCD), light-emitting diode (LED) display, organic LED display, active-matrix organic LED display, micro-LED display, plasma display, electroluminescent display, quantum dot display, projector display, cathode ray tube display, or other electronic visual display comprising a screen onto which visual elements are presented. Display screen 111 may or may not include a backlight component, depending on the display technology. Display screen 111 typically includes a display interface or link which couples to other elements in test device 110 which render graphics and integrate the rendered graphics into a display protocol or display link format.

Figure 8:
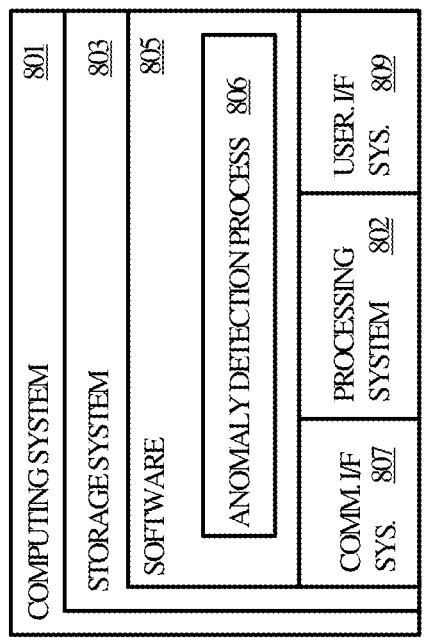
FIG. 8 illustrates an example computing system suitable for implementing any of the architectures, platforms, processes, methods, and operational scenarios disclosed herein.

Anomaly detection device 140 is further exemplified in FIG. 8, but can comprise various computing components with data processing elements suitable for at least the operations described above. Anomaly detection device 140 includes, but is not limited to, desktop and laptop computers, tablet computers, gaming computers, gaming consoles, media playback devices, mobile computers, audio devices, server computers, or other computing devices. Examples of anomaly detection device 140 may also include web servers, cloud computing platforms, and data center equipment, as well as any other type of physical or virtual server machine, container, and any variation or combination thereof. As mentioned above, anomaly detection device 140 includes control interface 141 and luminosity processor 142.

Figure 2:
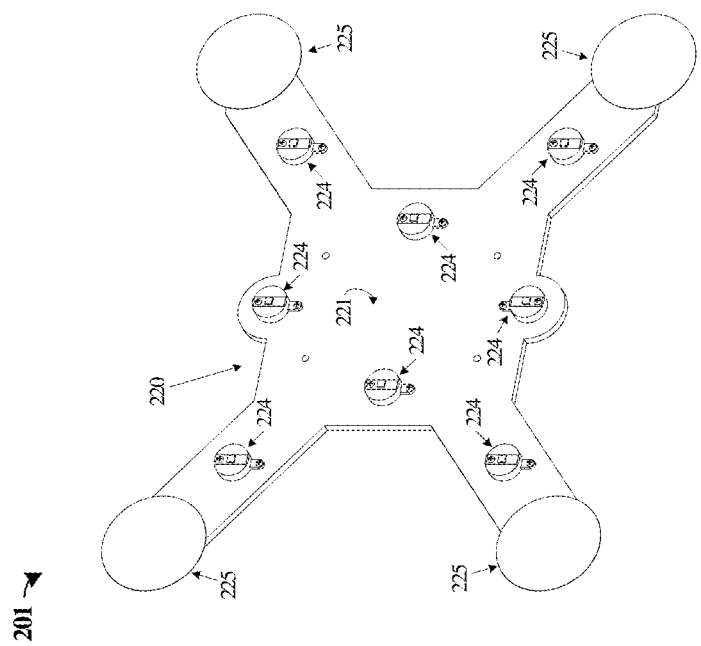
FIG. 2 illustrates an example test fixture assembly in an implementation.
Figure 2:
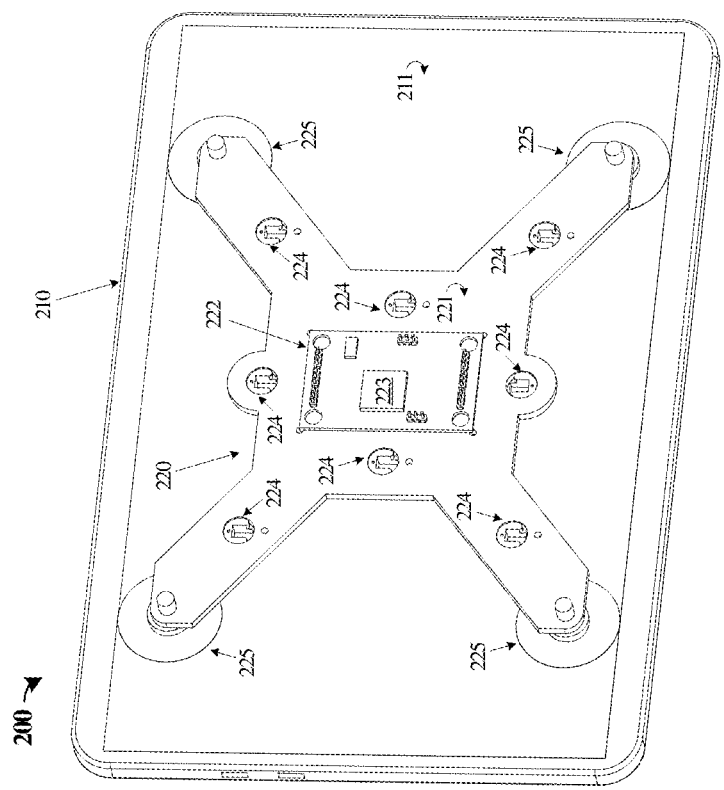

FIG. 2 is included to further illustrate example implementations of test fixture 120, although variations are possible. Specifically, FIG. 2 includes views 200-201 which illustrate different examples of test fixture 220. View 200 illustrates test fixture 220 applied to test device 210, which comprises display screen 211. View 201 illustrates the opposite side of test fixture 220 from that seen in view 200, which corresponds to a sensing face or side applied to test device 210.

Test fixture 210 comprises chassis 221 which forms a frame or mounting plate to which various other components are coupled. Chassis 221 provides for mounting points for luminosity sensors 224 such that the sensors are arrayed over a selected portion of display screen 211. Chassis 221 can comprise various materials sufficient to maintain a rigidity over the span used to measure display screen 211, which can vary based on screen size, among other factors. Example materials include metallic materials, such as aluminum, titanium, magnesium, steel, and alloys thereof. Other example materials include various polymers, such as acrylic, ABS, PVC, wood, laminate/composite material, carbon fiber reinforced materials, printed circuit board material, or fiberglass, among others. Chassis 221 can be formed by various manufacturing operations, including milling, machining, etching, additive manufacturing (e.g., 3D printing), casting, and other techniques. Chassis 221 has various apertures and mounting points which can house or hold luminosity sensors 224, processor assembly 222, and screen mounting elements 225.

Test fixture 210 can be mounted to provide luminosity sensors 224 with a view of display screen 211. Mounting elements 225 can be included to hold test fixture 210 onto display screen 211, and can comprise suction cups, adhesive portions, magnetic elements, clamps, or other features. Typically, mounting elements 225 will non-destructively and removably mount test fixture 210 to display screen 211.

Luminosity sensors 224 comprise photodetectors which convert incident light into electrical signaling indicating an intensity of photo-illumination. Luminosity sensors 224 might comprise photoresistors, photodiodes, phototransistors, image sensors, or other types of photodetectors capable of microsecond-scale measurements. Luminosity sensors 224 can couple over links to processor assembly 222 having processor 223. These links can include analog or digital links, along with any corresponding filtering, noise rejection elements, shielding, or other link elements.

Processor assembly 222 includes a printed circuit board that carries signaling among various processing elements, such as processor 223. In some examples, processor 223 (or separate analog-to-digital circuitry) can be configured to obtain luminosity measurements in an analog format from luminosity sensors 224 and convert these measurements to a digital format, or obtain periodic digital samples made of analog signals for luminosity sensors 224. Processor 223 can assemble, encapsulate, or package the measurements into luminosity signatures by time-correlating each of the luminosity measurements or assigning timestamps to the samples of each luminosity measurements. Processor 223 then transfers the luminosity signatures over a data link to an endpoint, such as an anomaly detection device or other computing device. Processor 223 can include audio measurements or audio recordings along with the luminosity measurements. The link type can be any discussed herein, such as USB, USB-C, Ethernet, wireless networking (e.g., Wi-Fi), discrete signaling, proprietary signaling, or any digital, analog, or packetized link. Examples of processor 223 include general purpose central processing units, graphical processing units, digital signal processors, application specific processors, and logic devices, Arduino® processing devices, as well as any other type of processing device, combinations, or variations thereof. Processor assembly 222 can also include various communication interfaces, power supply components, data storage elements, audio measurement or recording elements (microphone or interface to receive output audio from a test device).

Figure 3:
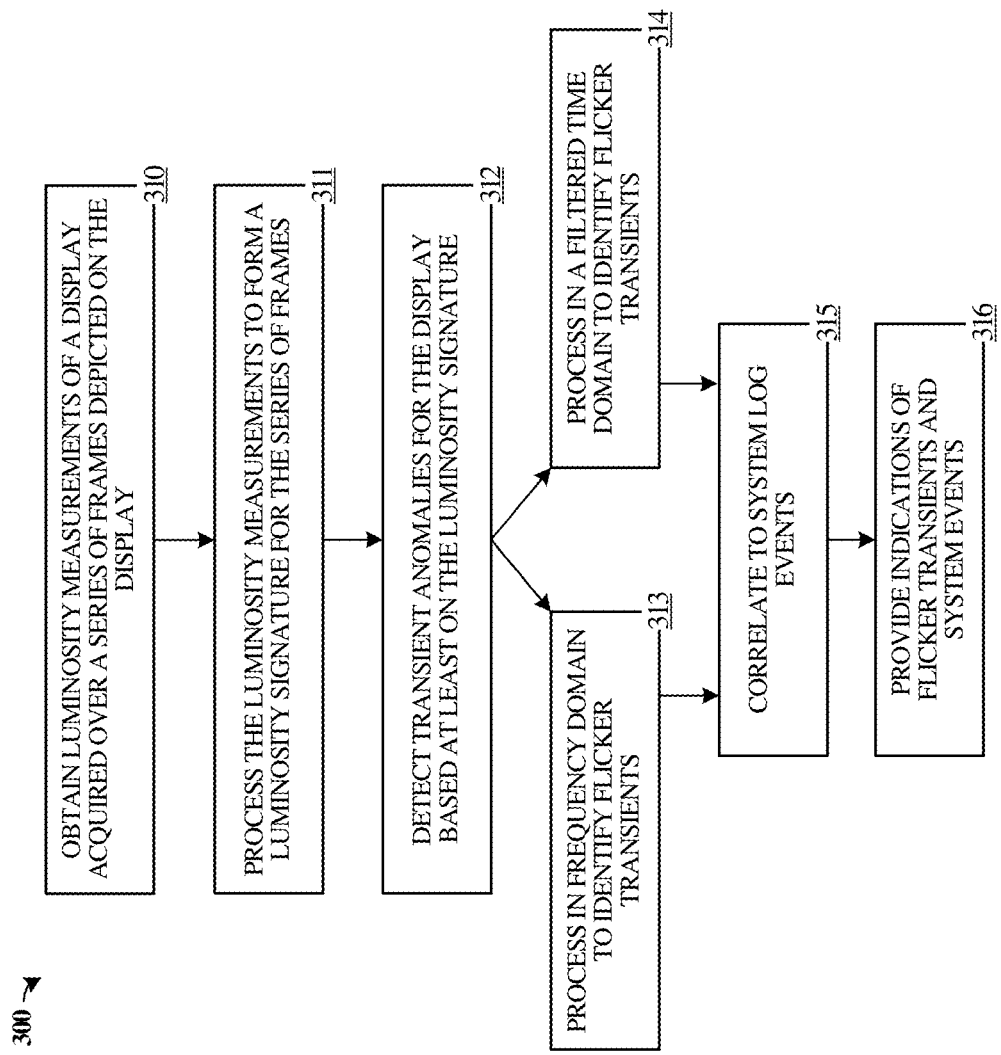
FIG. 3 illustrates example operations for a testing environment in an implementation.

FIG. 3 illustrates example operations for a testing environment in an implementation. The operations of FIG. 3 are discussed in the context of FIG. 1, although other elements presented herein can instead be employed.

In operation 310, anomaly detection device 140 obtains luminosity measurements of a display acquired over a series of frames depicted on the display. Anomaly detection device 140 obtains luminosity measurements received by control interface 141 and provided by test fixture 120 over link 143. While FIG. 1 shows an eight-point measurement scheme, other quantities of multi-point measurements can be employed. A luminosity signature is formed from a collection of luminosity measurements for a series of frames over a selected timeframe for display screen 111 obtained by luminosity sensors of test fixture 120. Luminosity processor 142 can process the luminosity measurements (operation 311) to form the luminosity signature for the series of frames, or alternatively, luminosity processor 142 might obtain the luminosity signature as determined by test fixture 120. The luminosity signature comprises a time-synchronized arrangement of the luminosity measurements, which might be accompanied by various metadata, system logs/events for test device 110, operational telemetry data for test device 110, audio data or measurements, identities of test device 110 and component specifications for internal components, and other information.

Based at least on the luminosity signatures, luminosity processor 142 can detect (operation 312) transient anomalies for display screen 111 based at least on the luminosity signature. The transient anomalies might comprise visual flicker events or instances of screen flicker spanning at least one frame or one screen refresh cycle. Flicker events can include visual anomalies that produce rapid unwanted visual changes to display screen 111, such as screen blanking events or screen color saturation events.

Luminosity processor 142 can employ different techniques to detect or identify transient anomalies. These include processing within a time domain (operation 314) or frequency domain (operation 313). A time domain includes samples of luminosity measurements in the luminosity signature, and a frequency domain includes performing a mathematical transform to convert the time domain representation into a frequency domain representation. This transform can include various type of Fourier transforms, including the Fast Fourier Transform (FFT), among others. Both the time domain and frequency domain might be employed to detect or identify transient events, including cross-correlation among events found in both the time domain and frequency domain.

For time domain processing, luminosity processor 142 can process a present luminosity signature against a set or collection of reference luminosity signatures to determine which reference luminosity signature corresponds to the same or similar graphical output as the present luminosity signature. For example, a set of reference luminosity signatures can be maintained as known-good or flicker-free luminosity signatures in a database or other data structure. Various dynamic graphical elements can be presented on a display screen under test, such as media content, movies, animations, operation system operations, and the like. Testing can be performed on test devices to obtain new luminosity signatures, and these can be compared against a corresponding reference luminosity signature to identify differences which might correspond to transient anomalies. Also, a timewise alignment can be established among the present luminosity signature and a reference luminosity signature to more effectively identify any differences. The alignment might be triggered or gauged to various events within a set of frames, such as a beginning of the series of frames or known-luminosity events within graphical content comprising the series of frames (i.e., scene changes, lighting changes, intermissions, animation/OS transitions, etc.).

For frequency domain processing, luminosity processor 142 can either transform the present luminosity signature into a frequency domain or process the time domain representation with one or more filters, among other frequency-based processing. In one example, a bandpass filter is applied to the present luminosity signature to identify luminosity events which fall within the filter passband, and events with an amplitude or intensity above a threshold level can be considered as transient anomalies or transient anomaly candidates. In another example, a frequency domain representation, such as an FFT representation, can be analyzed for events corresponding to a certain frequency range, such as that noted above for the bandpass filter. A bandpass filter might be applied in the frequency domain after the FFT transfer. Events with an amplitude or intensity above a threshold level for a range of frequencies in the FFT representation can be considered as transient anomalies or transient anomaly candidates. The set of candidates might be further processed to determine correlation among all luminosity channels for a given point in time, frame or set of frames, or refresh cycles to confirm if the candidates correspond to screen flicker, color saturation events, or other events of note.

Once one or more transient anomalies are identified, properties of the transient anomalies can be employed to correlate in time the transient anomalies to other activities of test device 110. This can include correlating (315) the transient anomalies to system log events of test device 110.

Figure 4:
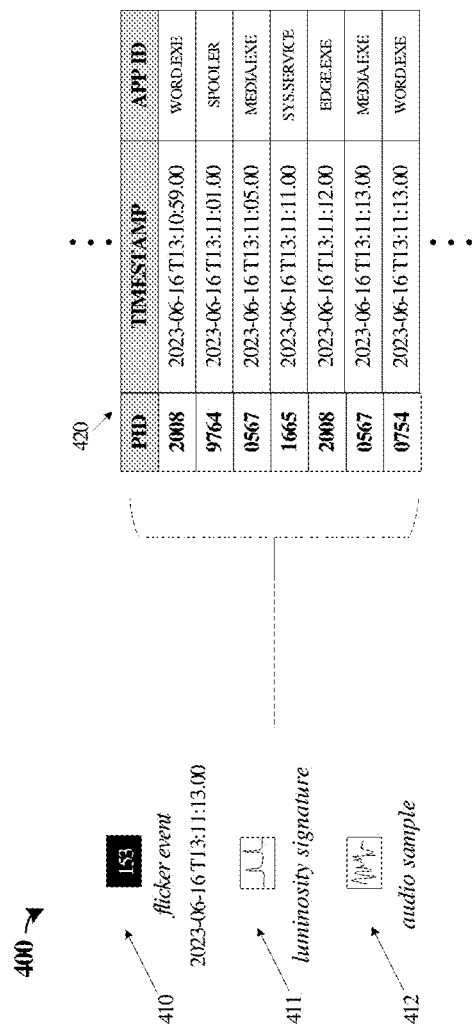
FIG. 4 illustrates an example system log correlation in an implementation.

FIG. 4 shows example 400 as one example of correlating system log events to transient anomalies. For an identified transient anomaly 410 corresponding to flicker event 153 of FIG. 1, a timestamp can be identified from test device 110. Transient anomaly 410 might also have a corresponding luminosity signature 411 which provides context for timeframes before and after transient anomaly 410, as well as an audio sample 412 for timeframes before and after transient anomaly 410. A system log of test device 110, corresponding to operating system events, among other activities, can be obtained. This system log might be correlated in time to the timestamp of transient anomaly 410, and a portion of the system log can be provided as a test context of transient anomaly 410. As seen for system log portion 420, a series of system events is included which precede transient anomaly 410.

System log portion 420 can be a portion of a larger system event log which can be generated by monitoring services executed by a test device which provide a record or log of events associated with usage of associated applications or operating system elements. Any log or events associated with the system-under-test can be employed, such as any log determined by a test device or telemetry snooping on that test device. In some examples, log events or telemetry snooping can indicate when a graphics processing unit (GPU) decode engine ramps up to trigger anomaly detection operations. System log portion 420 can include logged events from hardware monitoring elements which provide sensor data, environmental data, user interface event data, or other information related to usage of hardware elements. These hardware elements can include computing systems, such as personal computers, server equipment, distributed computing systems, or can include discrete sensing systems, industrial or commercial equipment monitoring systems, medical sensing equipment, or other hardware elements. In further examples, system log portion 420 can include monitored elements of a virtualized computing environment, which can include hypervisor elements, operating system elements, virtualized hardware elements, software defined network elements, among other virtualized elements.

Operation 316 includes luminosity processor 142 providing indications of the transient anomalies, such as flicker events, along with various metadata, timestamps, system events correlated in operation 315, and other accompanying information. From here, further determinations can be made as to root causes of transient anomaly 410 for debug, repair, software update regression testing failure identification and resolution, and other activities.

Figure 5:
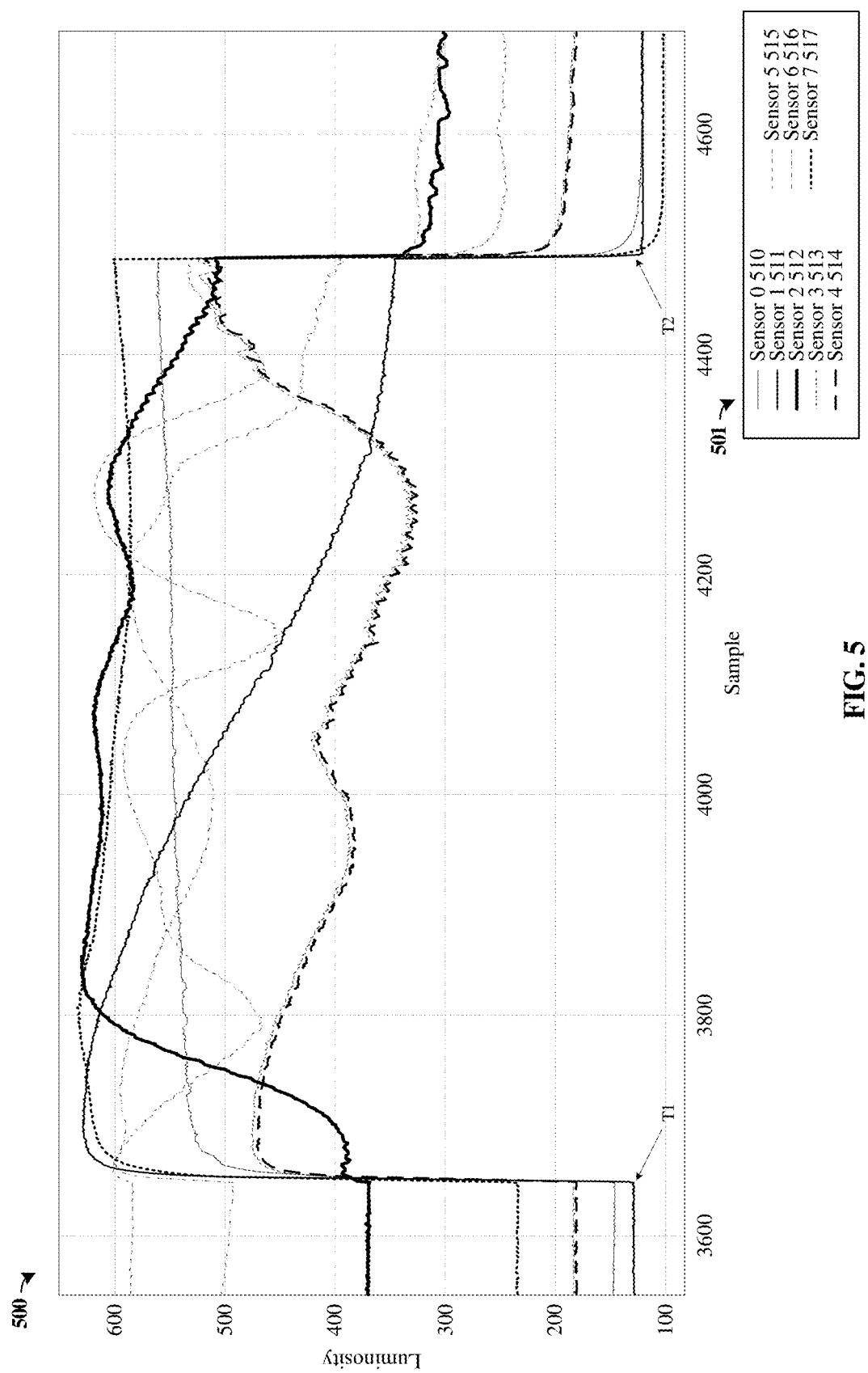
FIG. 5 illustrates example luminosity measurements in an implementation.
Figure 6:
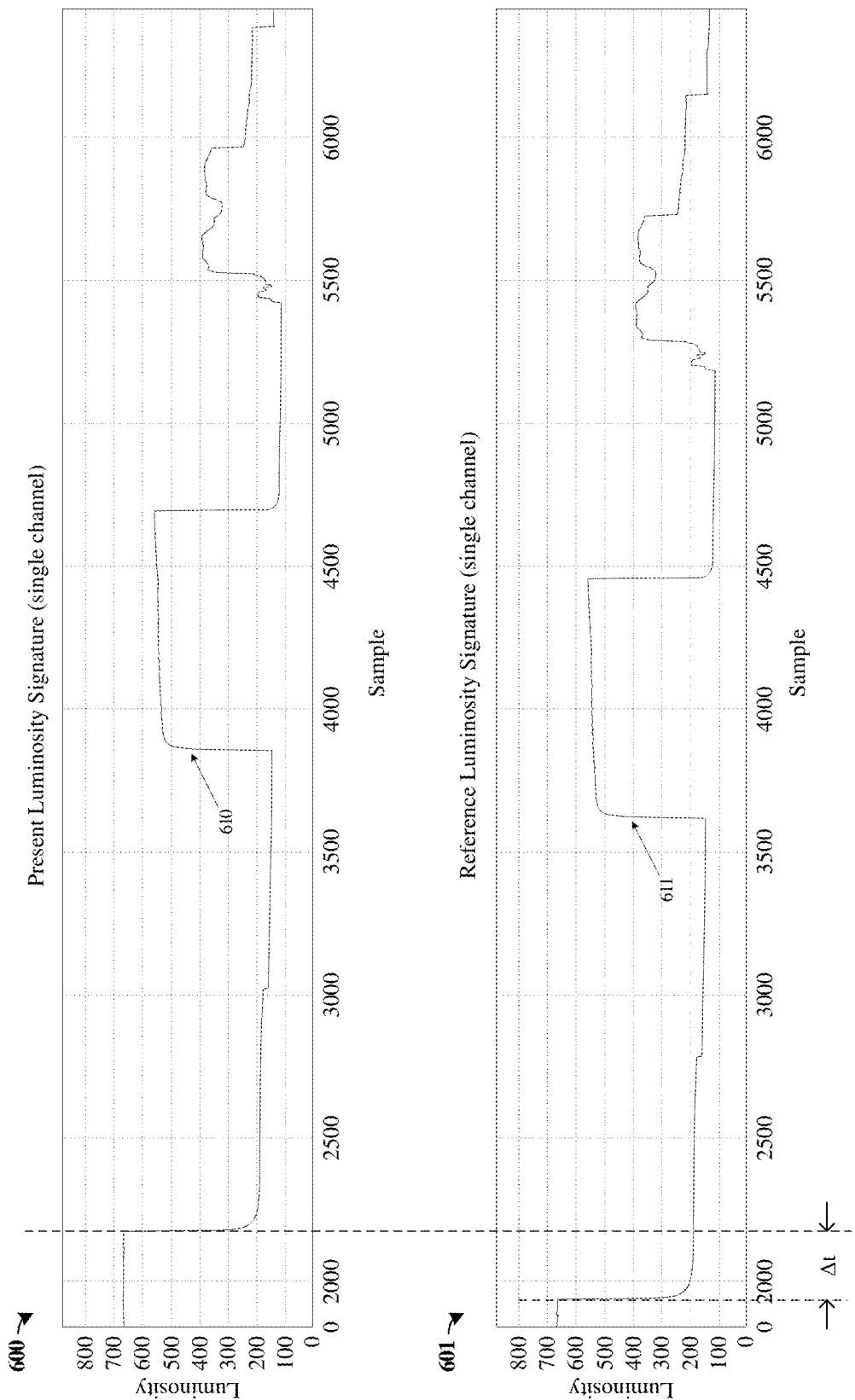
FIG. 6 illustrates example time domain luminosity processing in an implementation.
Figure 7:
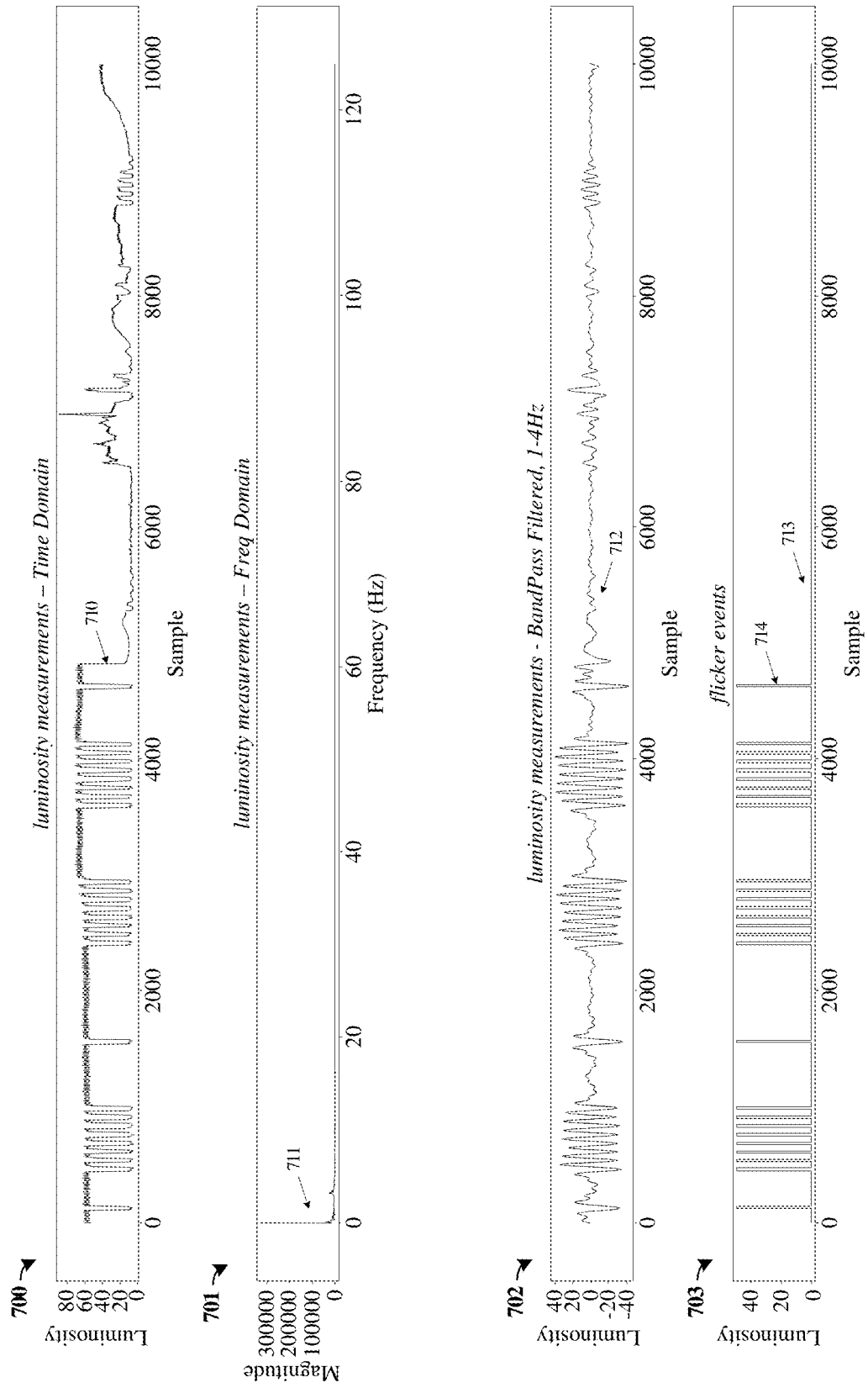
FIG. 7 illustrates example anomaly detection processing in an implementation.

Turning now to example measurements of luminosity and processing of luminosity signatures, FIGS. 5-7 are presented.

FIG. 5 includes graph 500 indicating an eight (8) channel luminosity measurement of a display screen. A vertical axis of graph 500 corresponds to luminosity intensity or magnitude (in lumens or other suitable metric), and a horizontal axis of graph 500 corresponds to samples over time. Legend 501 indicates eight sensor plots, each corresponding to a different location on a display screen, and each synchronized in time in graph 500. As can be seen, at time T1, a start of a test sequence is initiated, and at time T2, an end of a test sequence occurs. During the intervening time (T1-T2), various luminosity measurements are taken by associated luminosity sensors. These sensors are applied to corresponding locations on a display screen, and the on-screen images can fluctuate according to the various frames provided to the display screen. Transient events might occur during this timeframe, and further processing is provided to identify these events.

FIG. 6 includes graphs 600-601 indicating luminosity measurements of a display screen. Graph 600 corresponds to a present luminosity signature for a single luminosity sensor channel. Further channels can be acquired during measurement, but for clarity only a single channel is featured in FIG. 6. Graph 601 corresponds to a reference luminosity signature for a single luminosity sensor channel. As can be seen in FIG. 6, plot 610 in graph 600 is shifted in time (Δt) with respect to plot 611 of graph 601. This time shift can be identified by one or more events correlated among plot 610 and 611, such as the drop in luminosity shown indicating a metric Δt. This time shifting can assist in processing the present luminosity signature against the reference luminosity signature, as well as for identifying a reference luminosity signature that corresponds to the content or graphics used to form the present luminosity signature.

FIG. 7 includes graphs 700-703 indicating various data and transforms of luminance measurements of a display screen. Graph 700 illustrates a time domain plot 710 for a present luminosity signature for a single luminosity sensor channel. A vertical axis of graph 700 corresponds to a luminosity magnitude, and a horizontal axis corresponds to samples over time. Graph 701 illustrates a frequency domain plot 711 the present luminosity signature for a single luminosity sensor channel. A vertical axis of graph 701 corresponds to a frequency component magnitude, and a horizontal axis corresponds to frequency (Hz). Further channels can be acquired during measurement, but for clarity only a single channel is featured in FIG. 7. Frequency domain plot 711 can be determined from time domain plot 710, such as by processing time domain plot 710 with an FFT style of transform. As can be seen for time domain plot 710, various luminosity measurements are made, with some dramatic dips in luminosity shown, which might correspond to transient anomalies. However, further processing is provided to determine if these are actually transient anomalies.

From time domain plot 710, a bandpass filtered version of time domain plot 710 is shown for graph 702, which has a bandpass range of 1-4 Hz in this example. As with graph 700, graph 702 has a vertical axis corresponding to a luminosity magnitude, and a horizontal axis corresponding to samples over time. However, graph 702, due to the bandpass filter, has had any DC components filtered out. This results in plot 712 in graph 702 centered on a zero (0) luminosity, with positive and negative excursions from the zero point. Negative values correspond to falling edges of plot 710, and positive values correspond to rising edges of plot 701. The FFT in combination with a bandpass filter can produce a filtered signal which highlights or emphasizes sudden changes to a display, which can appear as higher frequency components of a luminosity signature.

Next, graph 703 illustrates plot 713 having flicker events, such as flicker event 714. The excursions from the zero point of plot 712 can have an amplitude or magnitude threshold applied thereto, which forms a binary representation of excursions which exceed a threshold amplitude or magnitude in plot 713. Plot 713 shows detected flicker events corresponding to samples where the luminance drops and increases occur withing a frequency window and exceeding a target magnitude. These flicker events can correspond to the transient anomalies discussed herein.

FIG. 8 illustrates computing device 801 that is representative of any system or collection of systems in which the various processes, programs, services, and scenarios disclosed herein may be implemented. Examples of computing device 801 include, but are not limited to, desktop and laptop computers, tablet computers, gaming computers, gaming consoles, media playback devices, mobile computers, audio devices, and wearable devices. Examples may also include server computers, web servers, cloud computing platforms, and data center equipment, as well as any other type of physical or virtual server machine, container, and any variation or combination thereof. Computing device 801 can be one example implementation of anomaly detection device 140 of FIG. 1 or processor 223 of FIG. 2, although variations are possible.

Computing device 801 may be implemented as a single apparatus, system, or device or may be implemented in a distributed manner as multiple apparatuses, systems, or devices. Computing device 801 includes, but is not limited to, processing system 802, storage system 803, software 805, communication interface system 807, and user interface system 809. Processing system 802 is operatively coupled with storage system 803, communication interface system 807, and user interface system 809.

Processing system 802 loads and executes software 805 from storage system 803. Software 805 includes and implements anomaly detection process 806, which is representative of control interface 141, luminosity processor 142, or operations 300, among other luminosity processing components, transient detection elements, operations, and processes. When executed by processing system 802, software 805 directs processing system 802 to operate as described herein for at least the various processes, operational scenarios, and sequences discussed in the foregoing implementations. Computing device 801 may optionally include additional devices, features, or functionality not discussed for purposes of brevity. Processing system 802 may comprise a microprocessor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, digital signal processors, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic storage media, optical storage media, flash memory, virtual memory and non-virtual memory, or any other suitable storage media. In no case is the computer readable storage media a propagated signal. In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including anomaly detection process 806) may be implemented in program instructions and among other functions may, when executed by processing system 802, direct processing system 802 to operate as described with respect to the various operational scenarios, sequences, and processes illustrated herein. For example, software 805 may include program instructions for implementing the luminance measurement and anomaly detection processes described herein. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing device 801 is representative) overall from a general-purpose computing system into a special-purpose computing system customized to perform the luminance measurement and anomaly detection processes in an optimized manner. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors. For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here. Communication between computing device 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. Example communication links and interfaces further include Ethernet interfaces, Wi-Fi (802.11xx) interfaces, Peripheral Component Interconnect Express (PCIe) interfaces, Compute Express Link (CXL), serial interfaces, serial peripheral interface (SPI) links, inter-integrated circuit (I2C) interfaces, universal serial bus (USB) interfaces, and UART interfaces, among others.

Advantageously, the examples presented herein can provide transient anomaly detection for various visual flickers or other unwanted behavior for display screens. The use of a test device along with an externally-applied test fixture can test in situ an entire stack of graphics generation, processing, rendering, transfer, and display. The test fixtures discussed herein can readily be attached to any device with a display screen, and can automate the activity of investigating flicker or other visual artifacts and anomalies. Moreover, these techniques and systems can detect anomalies that the human eye cannot perceive due to increasing refresh rates or frame rates. The techniques and systems can be used to detect audio anomalies and video/audio out of sync issues.

The luminosity fingerprinting or signatures determined herein can provide multi-point measurements of a display screen over time, which greatly reduces the needed storage and datasets for high-resolution, high-frame rate video or graphics. A luminosity signature comprises luminosity measurements for each frame, and over the course of many frames this signature trends towards a unique identity of the content displayed, such as a movie or animation. Contrary to analyzing each frame and pixel, which is computationally intensive, the examples herein reduce the complexity by luminance measurement on multiple points, and the number of points could be increased or decreased based on need. The luminosity signature for each frame provides sufficient information to automatically analyze and report flickers or anomalies, often in real-time instead and avoids lengthy post-processing.

In certain examples, a cost-effective test fixture can be fitted with low-cost processing elements and multiple photoresistors that provide scalable, readily deployable testing for labs, factory, and other test environments. The examples herein can measure randomly-distributed points on a display or screen to perform a luminance probe. By probing multiple points, a test system can generate a distinct pattern for each frame, referred to as a fingerprint or signature. Voltage levels for each photoresistor can be measured in a time domain and processed in a time or frequency domain, such as using bandpass filtering and FFT analysis. Sudden changes in luminosity, corresponding to high-frequency signal content, can indicate flicker or other anomalies. In other examples, the test systems can measure or record stereo audio channel values for each frame as an additional feature.

Further enhanced features include correlation in time of flicker anomalies to operating system log events for a device performing media playback on a display. The test system can provide indications of the flicker anomalies and operating system events contextualized to the flicker anomalies. This can be helpful when debugging or monitoring reboot cycles of a computing device which experiences flicker or other anomalies. Comparing frames using time domain cross-correlation can lead to 80% accuracy and allows the system to gather and process data at scale.

Certain inventive aspects may be appreciated from the foregoing disclosure, of which the following are various examples.

Example 1: A method, comprising obtaining luminosity measurements of a display acquired over a series of frames depicted on the display, processing the luminosity measurements to form a luminosity signature for the series of frames, and detecting transient anomalies for the display based at least on the luminosity signature.

Example 2: The method of Example 1, wherein the luminosity signature comprises multiple samples of the luminosity measurements for each frame over a period of time encompassing the series of frames.

Example 3: The method of Examples 1-2, comprising processing the luminosity signature to identify a reference luminosity signature that corresponds to the series of frames depicted on the display, and comparing at least a portion of the luminosity signature against the reference luminosity signature to determine differences between the reference luminosity signature and the luminosity signature indicating the transient anomalies.

Example 4: The method of Examples 1-3, comprising processing the luminosity signature against the reference luminosity signature to align the luminosity signature with respect to the reference luminosity signature in time according to luminosity events correlated among the luminosity signature and the reference luminosity signature.

Example 5: The method of Examples 1-4, comprising processing frequency components of the luminosity signature to determine frequency components above a threshold frequency selected to signify screen flicker anomalies.

Example 6: The method of Examples 1-5, comprising correlating the transient anomalies to operating system log events for a device generating the series of frames and comprising the display, and providing indications of at least the operating system log events as corresponding to the transient anomalies.

Example 7: The method of Examples 1-6, comprising correlating the transient anomalies to the operating system log events based at least on a trigger event in the operating system log events indicating a graphics rendering start time for the series of frames.

Example 8: The method of Examples 1-7, wherein the luminosity measurements comprise luminosity intensity measurements made at multiple selected locations across the display and correlated in time to frames among the series of frames.

Example 9: The method of Examples 1-8, comprising obtaining audio measurements corresponding to the series of frames and correlating the audio measurements to portions of the luminosity signature; and detecting anomalies in the audio measurements which correspond to the transient anomalies for the display.

Example 10: The method of Examples 1-9, wherein the series of frames depicted on the display corresponds to at least one among media playback on the display, operations within a user interface depicted on the display, or a boot process of a computing system comprising the display.

Example 11: An apparatus, comprising a processing system operatively coupled with one or more computer readable storage media, and program instructions stored on the one or more computer readable storage media. Based at least on being read and executed by the processing system, the program instructions direct the processing system to at least obtain luminosity measurements of a display acquired over a series of frames depicted on the display, process the luminosity measurements to form a luminosity signature for the series of frames, and detect transient anomalies for the display based at least on the luminosity signature.

Example 12: The apparatus of Example 11, wherein the luminosity signature comprises multiple samples of the luminosity measurements for each frame over a period of time encompassing the series of frames.

Example 13: The apparatus of Examples 11-12, comprising program instructions that further direct the processing system to at least process the luminosity signature to identify a reference luminosity signature that corresponds to the series of frames depicted on the display, and compare at least a portion of the luminosity signature against the reference luminosity signature to determine differences between the reference luminosity signature and the luminosity signature indicating the transient anomalies.

Example 14: The apparatus of Examples 11-13, comprising program instructions that further direct the processing system to at least process the luminosity signature against the reference luminosity signature to align the luminosity signature with respect to the reference luminosity signature in time according to luminosity events correlated among the luminosity signature and the reference luminosity signature.

Example 15: The apparatus of Examples 11-14, comprising program instructions that further direct the processing system to at least process frequency components of the luminosity signature to determine frequency components above a threshold frequency selected to signify screen flicker anomalies.

Example 16: The apparatus of Examples 11-15, comprising program instructions that further direct the processing system to at least correlate the transient anomalies to operating system log events for a device generating the series of frames and comprising the display, and provide indications of at least the operating system log events as corresponding to the transient anomalies.

Example 17: The apparatus of Examples 11-16, comprising program instructions that further direct the processing system to at least correlate the transient anomalies to the operating system log events based at least on a trigger event in the operating system log events indicating a graphics rendering start time for the series of frames.

Example 18: The apparatus of Examples 11-17, wherein the luminosity measurements comprise luminosity intensity measurements made at multiple selected locations across the display and correlated in time to frames among the series of frames.

Example 19: The apparatus of Examples 11-18, comprising program instructions that further direct the processing system to at least obtain audio measurements corresponding to the series of frames and correlating the audio measurements to portions of the luminosity signature, and detect anomalies in the audio measurements which correspond to the transient anomalies for the display.

Example 20: A system, comprising a luminosity assembly comprising luminosity sensors configured to acquire luminosity measurements of a display over a series of frames depicted on the display, and a luminosity processor. The luminosity processor is configured to receive the luminosity measurements and process the luminosity measurements to form a luminosity signature for the series of frames, and filtering the luminosity signature according to a bandpass filter having a frequency range that includes a frequency selected to indicate screen flicker anomalies, process the filtered luminosity signature to determine instances of the filtered luminosity signature exceeding a threshold amplitude, and transfer indications of the screen flicker anomalies comprising the instances.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The functional block diagrams, operational scenarios and sequences, and flow diagrams provided in the Figures are representative of exemplary systems, environments, and methodologies for performing novel aspects of the disclosure. The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosed examples. Those skilled in the art will also appreciate that the features described above can be combined in various ways to form multiple implementations. As a result, the invention is not limited to the specific implementations described above, but only by the claims and their equivalents.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A method, comprising:
   obtaining luminosity measurements of a display acquired over a series of frames depicted on the display;
   processing the luminosity measurements to form a luminosity signature for the series of frames; and
   detecting transient anomalies for the display based at least on the luminosity signature.

2. The method of claim 1, wherein the luminosity signature comprises multiple samples of the luminosity measurements for each frame over a period of time encompassing the series of frames.

3. The method of claim 2, comprising:
   processing the luminosity signature to identify a reference luminosity signature that corresponds to the series of frames depicted on the display; and
   comparing at least a portion of the luminosity signature against the reference luminosity signature to determine differences between the reference luminosity signature and the luminosity signature indicating the transient anomalies.

4. The method of claim 3, comprising:
   processing the luminosity signature against the reference luminosity signature to align the luminosity signature with respect to the reference luminosity signature in time according to luminosity events correlated among the luminosity signature and the reference luminosity signature.

5. The method of claim 1, comprising:
   processing frequency components of the luminosity signature to determine frequency components above a threshold frequency selected to signify screen flicker anomalies.

6. The method of claim 1, comprising:
   correlating the transient anomalies to operating system log events for a device generating the series of frames and comprising the display; and
   providing indications of at least the operating system log events as corresponding to the transient anomalies.

7. The method of claim 6, comprising:
   correlating the transient anomalies to the operating system log events based at least on a trigger event in the operating system log events indicating a graphics rendering start time for the series of frames.

8. The method of claim 1, wherein the luminosity measurements comprise luminosity intensity measurements made at multiple selected locations across the display and correlated in time to frames among the series of frames.

9. The method of claim 1, comprising:
   obtaining audio measurements corresponding to the series of frames and correlating the audio measurements to portions of the luminosity signature; and
   detecting anomalies in the audio measurements which correspond to the transient anomalies for the display.

10. The method of claim 1, wherein the series of frames depicted on the display corresponds to at least one among media playback on the display, operations within a user interface depicted on the display, or a boot process of a computing system comprising the display.

11. An apparatus, comprising:
a processing system operatively coupled with one or more computer readable storage media; and
program instructions stored on the one or more computer readable storage media that, based at least on being read and executed by the processing system, direct the processing system to at least:
obtain luminosity measurements of a display acquired over a series of frames depicted on the display;
process the luminosity measurements to form a luminosity signature for the series of frames; and
detect transient anomalies for the display based at least on the luminosity signature.

12. The apparatus of claim 11, wherein the luminosity signature comprises multiple samples of the luminosity measurements for each frame over a period of time encompassing the series of frames.

13. The apparatus of claim 12, comprising program instructions that further direct the processing system to at least:
process the luminosity signature to identify a reference luminosity signature that corresponds to the series of frames depicted on the display; and
compare at least a portion of the luminosity signature against the reference luminosity signature to determine differences between the reference luminosity signature and the luminosity signature indicating the transient anomalies.

14. The apparatus of claim 12, comprising program instructions that further direct the processing system to at least:
process the luminosity signature against the reference luminosity signature to align the luminosity signature with respect to the reference luminosity signature in time according to luminosity events correlated among the luminosity signature and the reference luminosity signature.

15. The apparatus of claim 11, comprising program instructions that further direct the processing system to at least:
process frequency components of the luminosity signature to determine frequency components above a threshold frequency selected to signify screen flicker anomalies.

16. The apparatus of claim 11, comprising program instructions that further direct the processing system to at least:
correlate the transient anomalies to operating system log events for a device generating the series of frames and comprising the display; and
provide indications of at least the operating system log events as corresponding to the transient anomalies.

17. The apparatus of claim 16, comprising program instructions that further direct the processing system to at least:
correlate the transient anomalies to the operating system log events based at least on a trigger event in the operating system log events indicating a graphics rendering start time for the series of frames.

18. The apparatus of claim 11, wherein the luminosity measurements comprise luminosity intensity measurements made at multiple selected locations across the display and correlated in time to frames among the series of frames.

19. The apparatus of claim 11, comprising program instructions that further direct the processing system to at least:
obtain audio measurements corresponding to the series of frames and correlating the audio measurements to portions of the luminosity signature; and
detect anomalies in the audio measurements which correspond to the transient anomalies for the display.

20. A system, comprising:
a luminosity assembly comprising luminosity sensors configured to acquire luminosity measurements of a display over a series of frames depicted on the display; and
a luminosity processor configured to:
receive the luminosity measurements and process the luminosity measurements to form a luminosity signature for the series of frames; and
filtering the luminosity signature according to a bandpass filter having a frequency range that includes a frequency selected to indicate screen flicker anomalies;
process the filtered luminosity signature to determine instances of the filtered luminosity signature exceeding a threshold amplitude; and
transfer indications of the screen flicker anomalies comprising the instances.

* * * * *